(12) United States Patent
Xiong et al.

(10) Patent No.: US 10,996,678 B2
(45) Date of Patent: May 4, 2021

(54) OBSTACLE AVOIDANCE METHOD AND SYSTEM FOR ROBOT AND ROBOT USING THE SAME

(71) Applicant: UBTECH Robotics Corp, Shenzhen (CN)

(72) Inventors: Youjun Xiong, Shenzhen (CN); Peng Nie, Shenzhen (CN); Xu Hu, Shenzhen (CN); Musen Zhang, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 283 days.

(21) Appl. No.: 16/236,524

(22) Filed: Dec. 30, 2018

(65) Prior Publication Data

US 2020/0042005 A1 Feb. 6, 2020

(30) Foreign Application Priority Data

Aug. 1, 2018 (CN) .......................... 201810863769.4

(51) Int. Cl.
*G05D 1/02* (2020.01)
*G05D 1/00* (2006.01)
*G01S 17/931* (2020.01)

(52) U.S. Cl.
CPC .......... *G05D 1/0214* (2013.01); *G01S 17/931* (2020.01); *G05D 1/0231* (2013.01); *G05D 1/0088* (2013.01)

(58) Field of Classification Search
CPC .. G05D 1/0214; G05D 1/0231; G05D 1/0088; G01S 17/931
See application file for complete search history.

(56) References Cited

U.S. PATENT DOCUMENTS

| | | | |
|---|---|---|---|
| 2017/0307759 A1* | 10/2017 | Pei | H04N 13/239 |
| 2017/0364090 A1* | 12/2017 | Grufman | G05D 1/0214 |
| 2018/0210448 A1* | 7/2018 | Lee | G06T 7/50 |
| 2019/0004520 A1* | 1/2019 | Maeno | G05D 1/0214 |

* cited by examiner

*Primary Examiner* — Jeff A Burke
*Assistant Examiner* — Jamal A Shah

(57) ABSTRACT

The present disclosure provides an obstacle avoidance method and system for a robot having ranging sensors as well as a robot using the same. The method includes: obtaining detection data collected by the plurality of ranging sensors; obtaining a current position of the robot based on the collected detection data; determining whether historical detection data corresponding to the current position has been stored; planning a movement path of the robot based on the collected detection data and the historical detection data and generating movement path information of the movement path, if the historical detection data corresponding to the current position has been stored; and controlling the robot to move along an obstacle-free path based on the movement path information. The present disclosure can effectively break through the limitation of the sensor technology, reduce the detection blind zone, and effectively improve the obstacle avoidance efficiency of a robot.

14 Claims, 8 Drawing Sheets

US 10,996,678 B2

OBSTACLE AVOIDANCE METHOD AND SYSTEM FOR ROBOT AND ROBOT USING THE SAME

CROSS REFERENCE TO RELATED APPLICATIONS

This application claims priority to Chinese Patent Application No. 201810863769.4, filed Aug. 1, 2018, which is hereby incorporated by reference herein as if set forth in its entirety.

BACKGROUND

1. Technical Field

The present disclosure relates to robot technology, and particularly to an obstacle avoidance method and system for a robot as well as a robot using the same.

2. Description of Related Art

With the continuous development of robot technology, the application of robots has become more and more widespread. In the autonomous navigation of a robot, it is necessary to sense the obstacle information in the external environment through various ranging sensors disposed on the robot, and plan the movement path of the robot in a reasonable manner alter analyzing the obstacle information so as to control the robot to avoid the obstacles in the environment and move safely.

At present, the robots with autonomous navigation capability are usually disposed with different types of ranging sensors to detect different kinds of environmental information to ensure that the robot can obtain the obstacle information completely. However, due to the limitation of sensor technology, the mixed use of multiple sensors will still cause the robot to have certain detection blind zones. For example, the single-line laser sensor can only collect the detection data on the horizontal plane parallel to the movement direction of the robot; the depth sensor has a large detection blind zone while it is used in close distance ranging since it has a smaller vision field, and the transparent object that cannot be effectively imaged cannot be detected; the ultrasonic sensor can detect the transparent objects while only the detection data of a single point can be collected, which has a small measurement range.

BRIEF DESCRIPTION OF THE DRAWINGS

To describe the technical schemes in this embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Embodiment 1

Figure 1:
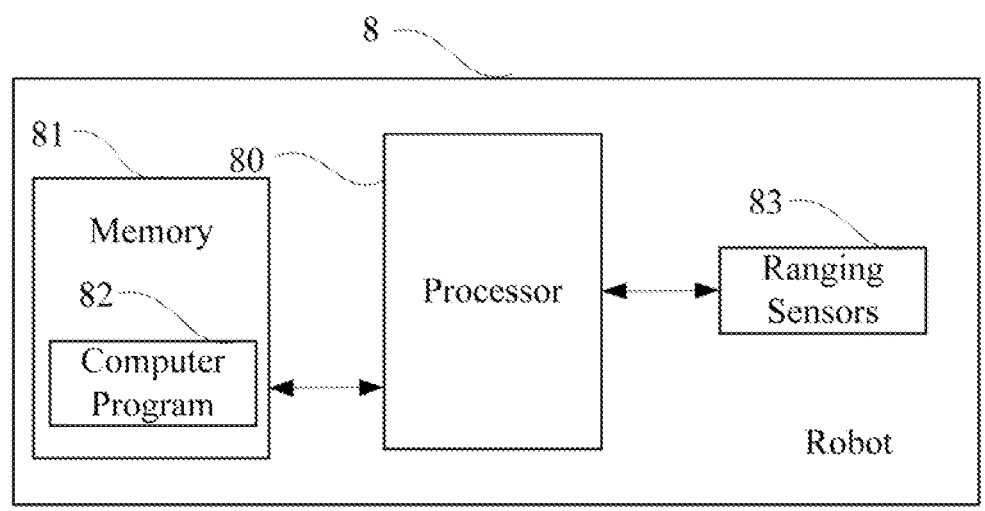
FIG. 1 is a schematic diagram of a robot according to a first embodiment of the present disclosure.
Figure 2:
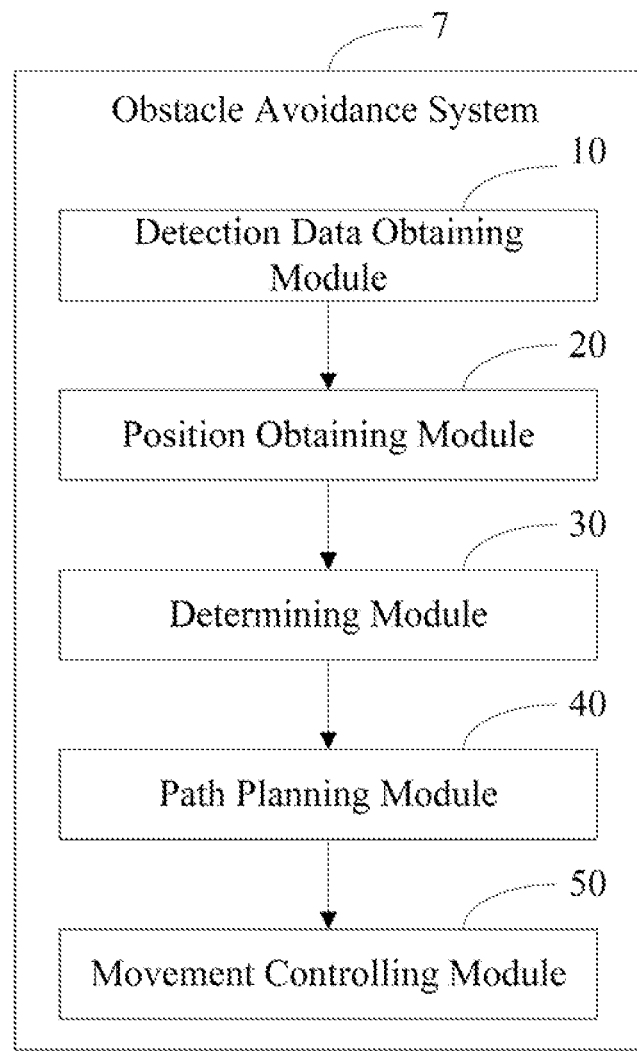
FIG. 2 is a schematic block diagram of a robot obstacle avoidance system according to a second embodiment of the present disclosure.

FIG. 1 is a schematic diagram of a robot according to a first embodiment of the present disclosure. As shown in FIG. 1, in this embodiment, a robot 8 is provided, which includes a processor 80, a memory 81, a computer program 82, and a plurality of ranging sensors 83. The computer program 82 is stored in the memory 81 and executable on the processor 80, for example, an obstacle avoidance program. When executing (instructions in) the computer program 82, the processor 80 implements the steps in the embodiments of the obstacle avoidance method, for example, steps S10-S50 shown in FIG. 4. Alternatively, when the processor 80 executes the (instructions in) computer program 82, the functions of each module/unit in the device embodiments, for example, the functions of the modules 10-50 shown in FIG. 2 are implemented.

Exemplarily, the computer program 82 may be divided into one or more modules/units, and the one or more modules/units are stored in the storage 81 and executed by the processor 80 to realize the present disclosure. The one or more modules/units may be a series of computer program instruction sections capable of performing a specific function, and the instruction sections are for describing the execution process of the computer program 82 in the robot 8. For example, computer program 82 can be divided into a detection data obtaining module, a position obtaining module, a determining module, a path planning module, and a movement controlling module. The specific function of each module is as follows:

the detection data obtaining module is configured to obtain detection data collected by the plurality of ranging sensors 83;

the position obtaining module is configured to obtain a current position of the robot based on the collected detection data;

the determining module is configured to determine whether historical detection data corresponding to die current position has been stored;

the path planning module is configured to plan a movement path of the robot based on the collected detection data and the historical detection data and generating movement path information of the movement path, if the historical detection data corresponding to the current position has been stored; and the movement controlling module is configured to control the robot to move along an obstacle-free path based on the movement path information.

The robot 8 may include, but is not limited to, a processor 80 and a storage 81. It can be understood by those skilled in the art that FIG. 1 is merely an example of the robot 8 and docs not constitute a limitation on the robot 8, and may include more or fewer components than those shown in the figure, or a combination of some components or different components. For example, the robot 8 may further include an input/output device, a network access device, a bus, and the like.

The processor 80 may be a central processing unit (CPU), or be other general purpose processor, a digital signal processor (DSP), an application specific integrated circuit (ASIC), a field-programmable gale array (FPGA), or be other programmable logic device, a discrete gate, a transistor logic device, and a discrete hardware component. The general purpose processor may be a microprocessor, or the processor may also be any conventional processor.

The storage 81 may be an internal storage unit of the robot 8, for example, a hard disk or a memory of the robot 8. The storage 81 may also be an external storage device of the robot 8, for example, a plug-in hard disk, a smart media card (SMC), a secure digital (SD) card, flash card, and the like, which is equipped on the robot 8. Furthermore, the storage 81 may further include both an internal storage unit and an external storage device, of the robot 8. The storage 81 is configured to store the computer program 82 and other programs and data required by the robot 8. The storage 81 may also be used to temporarily store data that has been or will be output.

Embodiment 2

FIG. 2 is a schematic block diagram of a robot obstacle avoidance system according to a second embodiment of the present disclosure. As shown in FIG. 2, in this embodiment, an obstacle avoidance system 7 for a robot is provided, where the robot is disposed with a plurality of ranging sensors. The obstacle avoidance system 7 is for performing the method in the above-mentioned method embodiments. In this embodiment, the obstacle avoidance system 7 is a software system (e.g., a program) executed by a processor of the robot. Referring to FIG. 2, the obstacle avoidance system 7 includes:

a detection data obtaining module 10 configured to obtain detection data collected by the plurality of ranging sensors;

a position obtaining module 20 configured to obtain a current position of the robot based on the collected detection data;

a determining module 30 configured to determine whether historical detection data corresponding to the current position has been stored;

a path planning module 40 configured to plan a movement path of the robot based on the collected detection data and the historical detection data and generating movement path information of the movement path, if the historical detection data corresponding to the current position has been stored; and a movement controlling module 50 configured to control the robot to move along an obstacle-free path based on the movement path information.

In one embodiment, the determining module 30 is further configured to determine whether the collected detection data is valid, and the obstacle avoidance system further includes:

a storage module configured to store the collected detection data as the historical detection data corresponding to the current position (for the next movement of the robot to the current position), if the collected detection data is valid.

In one embodiment, the path planning module 40 is further configured to plan the movement path of the robot based on the collected detection data and generate the movement path information of the movement path, if the historical detection data corresponding to the current position has not been stored.

In one embodiment, the detection data obtaining module 10 is further configured to obtain first detection data of the laser sensor at the current position, and obtain second detection data of the other sensor at the current position, and the obstacle avoidance system further includes:

a projection module configured to project the second detection data to a detection plane of the laser sensor to obtain projection data of the second detection data on the detection plane, where the first detection data is on the detection plane;

a coincidence degree determination module configured to determine a coincidence degree of the projection data and the first detection data;

a storage module configured to store the second detection data as the historical detection data corresponding to the current position, if the coincidence degree is 0; and a spatial distance obtaining module configured to obtain a first spinal distance between the first detection data and the robot and obtaining a second spatial distance between the projection data and the robot, if the coincidence degree is less than a preset threshold;

in which, the storage module is further configured to store the second detection data as the historical detection data corresponding to the current position, if the first spatial distance is larger than the second spatial distance.

In one embodiment, the obstacle avoidance system further includes:

a discarding module configured to discard the second detection data, if the coincidence degree is larger than or equal to the preset threshold or the first spatial distance is less than or equal to the second spatial distance.

In this embodiment, detection data collected by ranging sensors is obtained first, and a current position of a robot is obtained based on the collected detection data, then based un a stored historical detection data corresponding to the current position and the collected detection data, a movement path of the robot is planned and movement path information is generated, and then the robot is controlled to move along an obstacle-free path based on the movement path information, which is capable of effectively breaking through the limitation of the sensor technology, reducing the detection blind zone, and effectively improving the obstacle avoidance efficiency and the obstacle avoidance success rate of a robot.

In other embodiments, the obstacle avoidance system 7 may be an obstacle avoidance apparatus disposed on the robot, in which the apparatus may include a processor, a memory, and a computer program stored in the memory and executable on the processor. In which, the computer program includes the above-mentioned modules in the obstacle avoidance system 7. It should be noted that, each of the above-mentioned modules/units may be implemented in the form of hardware (e.g., a circuit), software (e.g., a program), or a combination thereof (e.g., a circuit with a single chip microcomputer).

Embodiment 3

Figure 3:
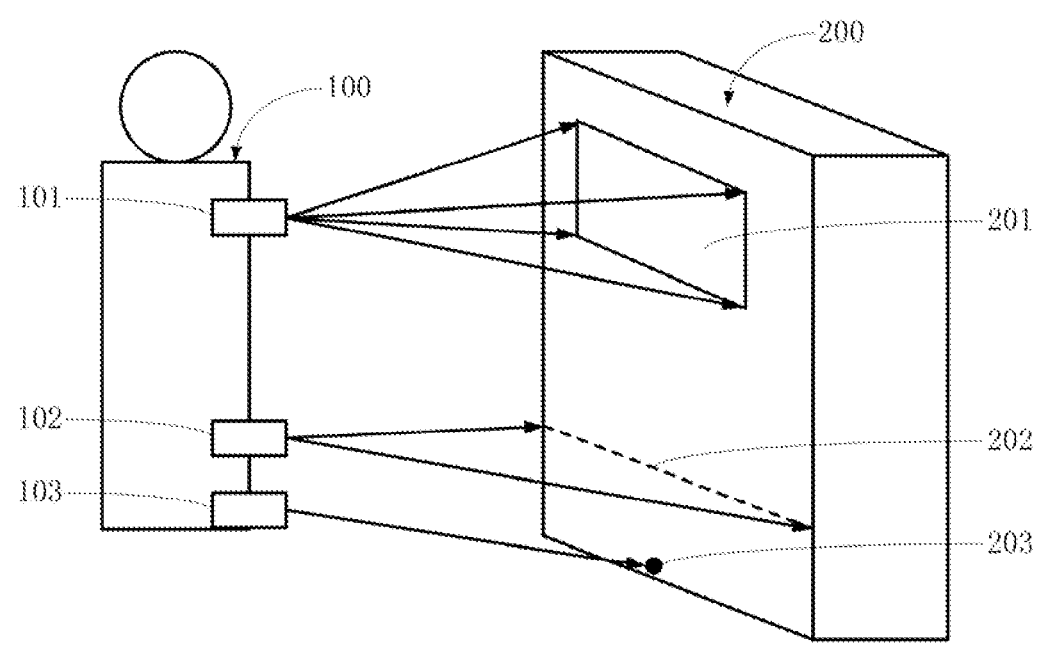
FIG. 3 is a schematic diagram of a robot and a detection plane of its sensors according to a third embodiment of the present disclosure.

FIG. 3 is a schematic diagram of a robot and a detection plane of its sensors according to a third embodiment of the present disclosure. As shown in FIG. 3, in this embodiment, a robot 100 having autonomous navigation capability is provided, which includes a plurality of ranging sensors.

In this embodiment, the robot refers to any robot having an autonomous navigation capability, which may include a humanoid robot or a non-human robot with any structure, for example, an automatic guided vehicle, a sweeping robot, a robot assistant, or the like.

Exemplary, FIG. 3 shows that the robot 100 is a robot including a spherical head and a rectangular body.

In a specific application, the robot may include any type of ranging sensors (sensors for ranging), for example, laser sensor (e.g., laser radar), depth sensor (e.g., depth camera), infrared sensor, ultrasonic sensor (e.g., ultrasonic radar).

Exemplary, FIG. 3 shows that on a body part of the robot 100, a depth sensor 101, a laser sensor 102, and an ultrasonic sensor 103 are disposed in the order from top to bottom. In which, the detection area of the depth sensor 101 is a plane area 201 of the object 200 which faces the robot 100. The detection area of the laser sensor 102 is a line 202 of the object 200 which faces the robot 100, and the detection area of the ultrasonic sensor 103 is a point 203 of the object 200 which faces the robot 100.

It should be understood that, the structure and shape of the robot 100 shown in FIG. 3 is merely exemplary and is for illustrative purposes only, which do not represent the actual structure and shape of the robot.

In an actual application, due to the limitation of sensor technology, the mixed use of multiple sensors will still cause the robot to have certain detection blind zones. For example, the detection blind zone of the robot 100 shown in FIG. 3 is an area of the object 200 which faces the robot 100 and is not covered by the plane area 201, the line 202, and the point 203.

In order to solve the problem that the obstacle avoidance efficiency and the obstacle avoidance success rate of the robot are reduced due to the presence of the detection blind zone of the robot, this embodiment provides an obstacle avoidance method for a robot. The method can be applied to the above-mentioned robot 100, and can be executed by a processor disposed on a robot 100. The processor is communicatively connected to each sensor, so as to obtain the detection data of each sensor. The processor also has an internal storage space and/or is connected to a storage (e.g., a memory) for storing the obtained detection data.

The processor 60 may be a central processing unit (CPU), or be other general purpose processor, a digital signal processor (DSP), an application specific integrated circuit (ASIC), a field-programmable gate array (FPGA), or the other programmable logic device, a discrete gate, a transistor logic device, and a discrete hardware component. The general purpose processor may be a microprocessor, or the processor may also be any conventional processor.

Figure 4:
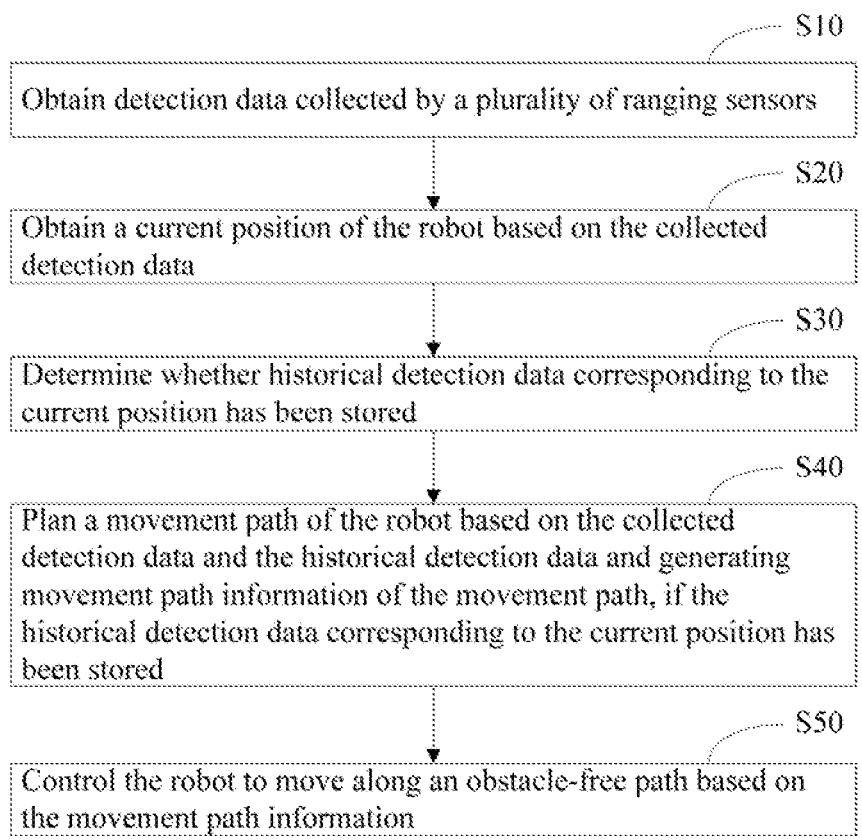
FIG. 4 is a flow chart of an obstacle avoidance method for a robot according to the third embodiment of present disclosure.

FIG. 4 is a flow chart of an obstacle avoidance method for a robot according to the third embodiment of present disclosure. In this embodiment, the method is a computer-implemented method executable for a processor, which may be implemented through a robot obstacle avoidance system as shown in FIG. 2 or a robot as shown in FIG. 1. The method can be applied to a robot which is disposed with a plurality of ranging sensors. In other embodiments, the may be further disposed with other types of sensors. As shown in FIG. 4, the method includes the following steps.

S10: obtaining detection data collected by the plurality of ranging sensors.

In a specific application, after each sensor of the robot is enabled, the detection data is collected in real time or at a fixed frequency (i.e., there's a preset time interval between each collection). The type of the detection data is determined by the type of the sensor, for example, the detection data collected by the depth sensor is depth data, and the detection data collected by the ultrasonic sensor is ultrasonic data. The (currently) collected detection data is the detection data collected by each sensor at the current time.

S20: obtaining a current position of the robot based on the collected detection data.

In a specific application, by processing and analyzing the detection data (currently) collected by each sensor, the shape and contour of each object in the current environment and the distance between the detected object and the robot can be determined, and the distance and orientation of the robot with respect to each object in the environment at the current time can be determined based on the data, so as to know the position of the robot in the current environment at the current time.

S30: determining whether historical detection data corresponding to the current position has been stored.

In a specific application, before the current time, if the robot once collected the valid and accurate detection data at the current position, the valid and accurate detection data is stored as the historical detection data, so that the robot can use in the subsequent movement.

In one embodiment, after step S20, the method further includes:
determining whether the collected detection data is valid; and
storing the collected detection data as the historical detection data corresponding to the current position (for the next movement of the robot to the current position), if the collected detection data is valid.

S40: planning a movement path of the robot based on the collected detection data and the historical detection data and generating movement path information of the movement path, if the historical detection data corresponding to the current position has been stored. The movement path information may include, for example, a route map for the movement path.

In a specific application, since the historical detection data is the valid data collected by the robot when it is moved to the current position at last time, whether the collected detection data is valid and/or accurate or not, the robot can therefore be helped to plan the movement path in a more accurate manner by combining the valid data which is collected last time, so that the robot can accurately predict the obstacles in the current environment in time to prevent the robot from colliding with the objects in the current environment.

In one embodiment, after step S30, the method further includes:

planning the movement path of the robot based on the collected detection data and generating the movement path information of the movement path, if the historical detection data corresponding to the current position has not been stored.

In a specific application, if the robot is moved in the current environment for the first time or had not stored the valid data corresponding to the current position, the movement path can be directly planned based on the (currently) collected detection data.

S50: controlling the robot to move along an obstacle-free path based on the movement path information.

In which, the obstacle-free path is a path for the robot to move in the environment at which the robot locates on the premise that the robot can be kept away front the obstacles in the environment.

In a specific application, after generating the movement path information, the robot can be controlled to move based on the information while timely and effectively avoiding the obstacles in the current environment.

In this embodiment, detection data collected by ranging sensors is obtained first, and a current position of a robot is obtained based on the collected detection data, then based on a stored historical detection data corresponding to the current position and the collected detection data, a movement path of the robot is planned and movement path information is generated, and then the robot is controlled to move along an obstacle-free path based on the movement path information, which is capable of effectively breaking through the limitation of the sensor technology, reducing the detection blind zone, and effectively improving the obstacle avoidance efficiency and the obstacle avoidance success rate of a robot.

Embodiment 4

In this embodiment, the robot includes a laser sensor and at least one other sensor.

In one embodiment, the at least one other sensor includes a depth sensor and an ultrasonic sensor. For example, the robot may be the robot 100 shown in FIG. 3.

Figure 5:
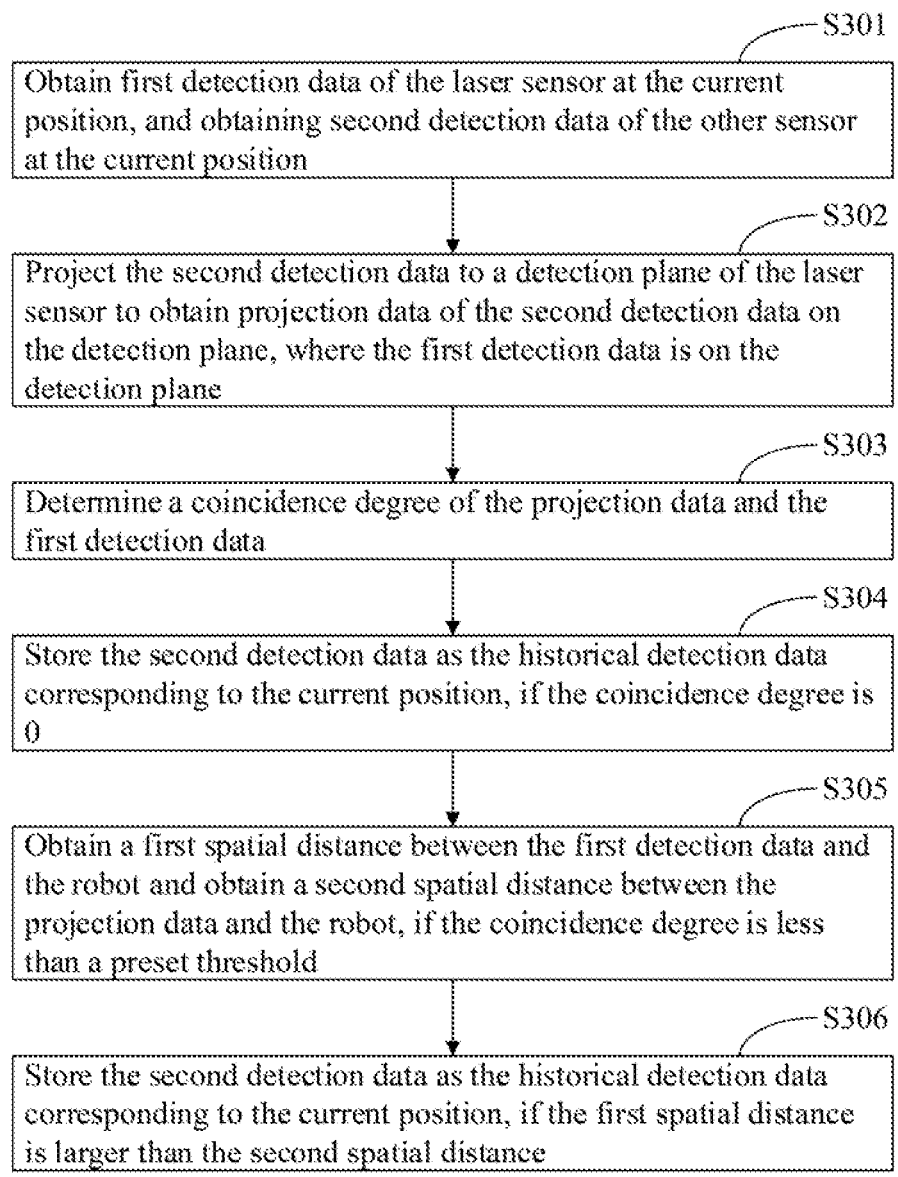
FIG. 5 is a flow chart of an obstacle avoidance method for a robot according to a fourth embodiment of present disclosure.

FIG. 5 is a flow chart of an obstacle avoidance method for a robot according to a fourth embodiment of present disclosure. As show n in FIG. 5, based on the robot provided in Embodiment 3, step S10 in Embodiment 3 includes the following steps.

S301: obtaining first detection data of the laser sensor at the current position, and obtaining second detection data of the other sensor at the current position.

In a specific application, the first detection data may be laser ranging data collected by the laser sensor at the current position, and the second detection data may include depth data collected by the depth sensor at the current position and/or ultrasonic sensor data collected by the ultrasonic sensor at the current position.

S302: projecting the second detection data to a detection plane of the laser sensor to obtain projection data of the second detection data on the detection plane, where the first detection data is on the detection plane.

In a specific application, the detection plane of the laser sensor is a plane parallel to the movement direction of the robot, and the second detection data (and the laser ranging data) is at the detection plane.

Figure 6:
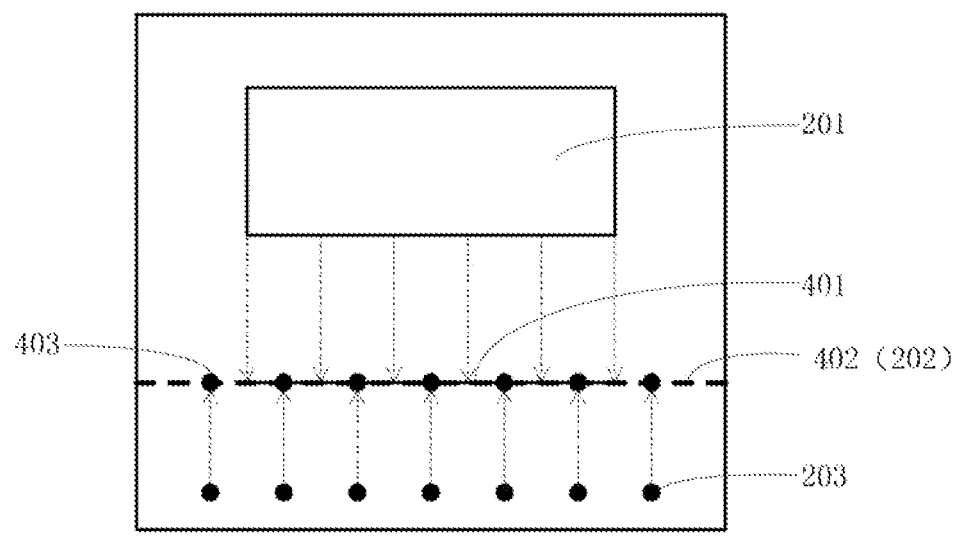
FIG. 6 is a schematic diagram of a projection process according to the fourth embodiment of present disclosure.

FIG. 6 is a schematic diagram of a projection process according to the fourth embodiment of present disclosure. As shown in FIG. 6, projection data of the detection data collected by the robot shown in FIG. 3 on the detection plane of the laser sensor is exemplarily shown. In FIG. 6, the projection data of the depth data is a straight line 401 located at the detection plane, the laser ranging data is a broken line 402 located at the detection plane, and the projection data of the ultrasonic data is a plurality of points 403 located at the detection plane. The dotted arrow in FIG. 6 indicates the projection direction.

In a specific application, as shown in FIG. 6, the second detection data is projected onto the detection plane where the first detection data is located, thereby eliminating the difference between the first detection data and the second detection data in a direction perpendicular to the movement direction of the robot, and the difference between the first detection data and the second detection data in the detection plane parallel to the movement direction of the robot can be intuitively compared.

S303: determining a coincidence degree of the projection data and the first defection data.

In a specific application, after the second detection data is projected onto the detection plane where the first detection data is located, the degree of the coincidence between the projection data and the first detection data can be determined in a convenient manner, for example, referring to FIG. 6, an overlapping portion of the broken line 401 and the straight line 402 is the overlapping portion of the laser ranging data and the projection data of the depth data.

In a specific application, the projection data refers to projection data corresponding to the detection data of any other sensor of the robot. When the robot includes more than one other sensors, it is necessary to respectively determine the coincidence degree of the projection data corresponding to each other sensor and the first detection data.

S304: storing the second detection data as the historical detection data corresponding to the current position, if the coincidence degree is 0.

In a specific application, if the coincidence degree of the projection data of the second detection data and the first detection data is 0, it indicates that all the data collected by the other sensor which corresponds to the second detection data had not been collected by the laser sensor. In order to avoid the robot to plan the movement path by merely using the first detection data when the robot is moved to the current position at the next time which causes the robot to collide with the obstacle, the second detection data needs to be stored as the historical detection data corresponding to the current position, so as to be used when the robot is moved to the current position at the next time. If the coincidence degree is 0, the robot can directly use the first detection data and the second detection data simultaneously in the current movement.

S305: obtaining a first spatial distance between the first detection data and the robot and obtaining a second spatial distance between the projection data and the robot, if the coincidence degree is less than a preset threshold.

In a specific application, the preset threshold may be set according to actual needs, for example, may be set to any value between 50% and 100%. If the coincidence degree is less than the preset threshold, it indicates that the other sensor corresponding to the second detection data has collected part of the data which is not collected by the laser sensor. In this case, it is necessary to further determine the validity of the projection data and the first detection data, that is, determine which of the two data is collected by the corresponding sensor closer to the obstacle. The spatial distance between the projection data on the detection plane and the robot as well as the spatial distance between the first detection data and the robot can be obtained, and then the two spatial distances are compared to determine which sensor corresponding to the data is closer to the obstacle.

S306: storing the second detection data as the historical detection data corresponding to the current position, if the first spatial distance is larger than the second spatial distance.

In a specific application, if the first spatial distance is larger than the second spatial distance, it indicates that the sensor corresponding to the projection data is closer to the obstacle, and the second detection data corresponding to the projection data is blind zone data that cannot be effectively collected by the laser sensor. Therefore, the second detection data is needed to be stored as the historical detection data, so as to be used in combination with the first detection data when the robot is at the current position at this time and at next time, thereby planning the movement path.

In one embodiment, after step S306, the method further includes:

discarding the second detection data, if the coincidence degree is larger than or equal to the preset threshold or the first spatial distance is less than or equal to the second spatial distance.

In this embodiment, the validity of the detection data collected by other sensor is determined, the valid data is stored while the invalid data is discarded, which is capable of planning the movement path in a reasonable manner based on the valid data and the laser ranging data, thereby improving the obstacle avoidance efficiency and the obstacle avoidance success rate of a robot. In addition, through discarding invalid data, data redundancy can be effectively avoided, the storage space can be freed up, thereby improving the data processing speed of the robot.

Embodiment 5

Figure 7:
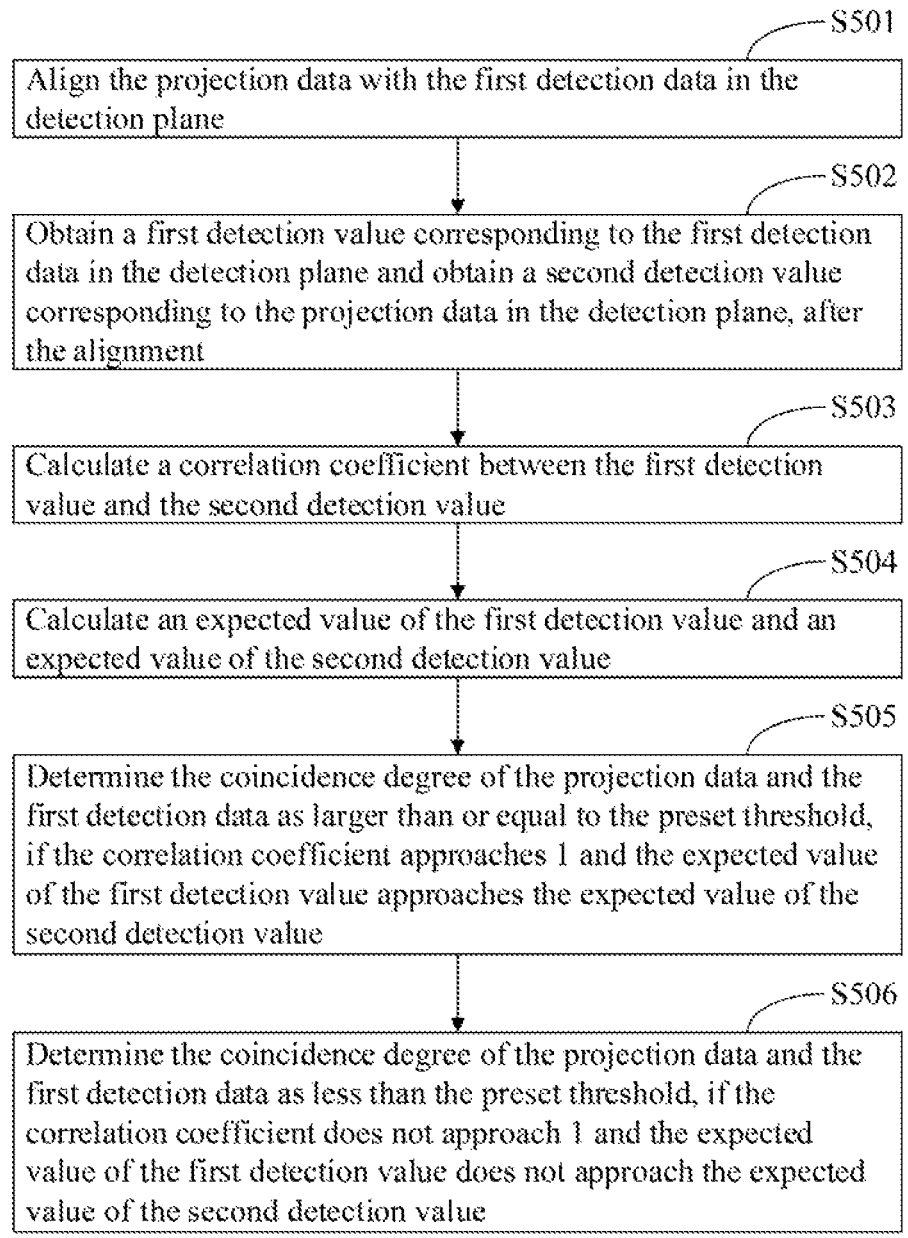
FIG. 7 is a flow chart of an obstacle avoidance method for a robot according to a fifth embodiment of present disclosure.

FIG. 7 is a flow chart of an obstacle avoidance method for a robot according to a firth embodiment of present disclosure. As shown in FIG. 7, in this embodiment, step S303 in Embodiment 4 includes the following steps.

S501: aligning the projection data with the first detection data in the detection plane.

In a specific application, any alignment maybe adopted to align the projection data with the first detection data, for example, center alignment, left alignment, or right alignment.

S502: obtaining a first detection value corresponding to the first detection data in the detection plane and obtaining a second detection value corresponding to the projection data in the detection plane, after the alignment.

In a specific application, after the second detection data is projected onto the detection plane, since the difference between the projection data and the first detection data in a direction perpendicular to the movement direction of the robot is eliminated, the first detection value and the second detection value may be represented as a horizontal coordinate at the detection plane.

S503: calculating a correlation coefficient between the first detection value and the second detection value.

In this embodiment, the expression of the first detection value is:

$X = [x_1, x_2, \ldots, x_n | n \in N]$;

the expression of the second detection value is:

$Y = [y_1, y_2, \ldots, y_m | m \in N]$;

the formula for calculating the correlation coefficient between the first detection value and the second detection value is:

$$\rho_{XY} = \frac{Cov(X, Y)}{\sqrt{D(X)} \square \sqrt{D(Y)}};$$

where, X is the first detection value, Y is the second detection value, $x_1, x_2, \ldots, x_n$ each is the value of each data point in the first detection data, $y_1, y_2, \ldots, y_m$ each is the value of each data point in the projection data, N indicates a natural number, $\rho_{XY}$ is the correlation coefficient, $Cov(X, Y)$ is a covariance between the first detection value and the second detection value, $D(X)$ is a variance of the first detection value, and $D(Y)$ is a variance of the second detection value.

S504: calculating an expected value of the first detection value and an expected value of the second detection value.

In a specific application, the expected value of the first detection value is the average value of the values of all the data points in the first detected data; the expected value of the second detection value is the average value of the values of all the data points in the projected data.

S505: determining the coincidence degree of the projection data and the first detection data as larger than or equal to the preset threshold, if the correlation coefficient approaches 1 and the expected value of the first detection value approaches the expected value of the second detection value.

S506: determining the coincidence degree of the projection data and the first detection data as less than the preset threshold, if the correlation coefficient does not approach 1 and the expected value of the first detection value does not approach the expected value of the second detection value.

An error is allowed when determining whether the correlation coefficient approaches 1 or not (i.e., whether the correlation coefficient approaches 1 or not can be determined to a tolerance); similarly, an error is also allowed when determining whether the expected value of the first detection value approaches the expected value of the second detection value or not (i.e., whether the expected value of the first detection value approaches the expected value of the second detection value or not can be determined to a tolerance). In which, the allowable errors can be respectively defined according to the actual needs and/or the experiences of implementation.

In this embodiment a method for determining the coincidence degree between the projection data and the first detection data is provided, which is capable of determining the coincidence degree between the projection data and the first detection data accurately and quickly, so that the validity of the projection data can be determined accurately and quickly.

Embodiment 6

Figure 8:
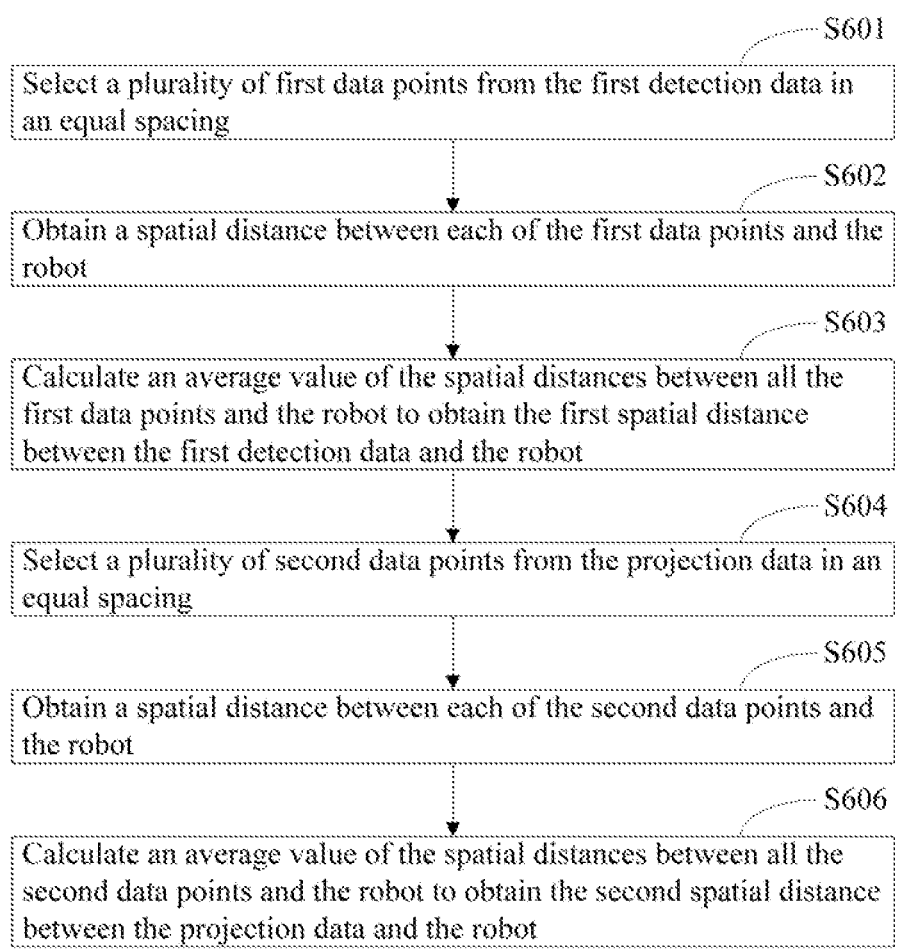
FIG. 8 is a flow chart of an obstacle avoidance method for a robot according to a sixth embodiment of present disclosure.

FIG. 8 is a flow chart of an obstacle avoidance method for a robot according to a sixth embodiment of present disclosure. As shown in FIG. 8, in this embodiment, step S305 in Embodiment 4 includes the following steps.

S601: selecting a plurality of first data points from the first detection data in an equal spacing.

S602: obtaining a spatial distance between each of the first data points and the robot S603: calculating an average value of the spatial distances between all the first data points and the robot to obtain the first spatial distance between the first detection data and the robot.

In a specific application, the amount of the first data points may be determined according to actual needs, and the more the amount of the first data points, the more accurate the calculated first spatial distance.

S604: selecting a plurality of second data points from the projection data in an equal spacing.

S605: obtaining a spatial distance between each of the second data points and the robot.

S606: calculating an average value of the spatial distances between all the second data points and the robot to obtain the second spatial distance between the projection data and the robot.

In a specific application, the amount of the second data points can be determined according to actual needs, and the more the amount of the second data points, the more accurate the calculated second spatial distance.

In a specific application, the spatial distances between the first detection data as well as the projection data and the robot may be the distances between the first detection data as well as the projection data and any point of the robot, for example, the geometric center of the robot, any point on the vertical central axis of the robot, or the like.

In this embodiment, a method for determining the spatial distance between the projection data as well as the first detection data and the robot is provided, which is capable of determining the spatial distance between the projection data as well as the first detection data and the robot accurately and quickly, thereby determining the magnitude of the first spatial distance and the second spatial distance accurately and quickly, so that the validity of the projection data can be determined accurately and quickly.

It should be understood that, the sequence of the serial number of the steps in the above-mentioned embodiments does not mean the execution order while the execution order of each process should be determined by its function and internal logic, which should not be taken as any limitation to the implementation process of the embodiments.

Those skilled in the art may clearly understand that, for the convenience and simplicity of description, the division of the above-mentioned functional units and modules is merely an example for illustration. In an actual application, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the an may implement the described functions in different manners for each particular application, while such implementation should not be considered as beyond the scope of the present disclosure.

In the embodiments provided by the present disclosure, it should be understood that the disclosed system/robot and method may be implemented in other manners. For example, the above-mentioned system/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented obstacle avoidance method for a robot disposed with a plurality of ranging sensors, comprising executing on a processor the steps of:
   obtaining detection data collected by the plurality of ranging sensors;
   obtaining a current position of the robot based on the collected detection data;
   determining whether historical detection data corresponding to the current position has been stored;
   planning a movement path of the robot based on the collected detection data and the historical detection data and generating movement path information of the movement path, in response to the historical detection data corresponding to the current position having been stored; and
   controlling the robot to move along an obstacle-free path based on the movement path information;
   wherein the plurality of ranging sensors comprise a laser sensor and at least one other sensor, and before the step of obtaining the detection data collected by the plurality of ranging sensors comprises:
   obtaining first detection data of the laser sensor at the current position, and obtaining second detection data of the other sensor at the current position;
   projecting the second detection data to a detection plane of the laser sensor to obtain projection data of the second detection data on the detection lane wherein the first detection data is on the detection plane;
   determining a coincidence degree of the projection data and the first detection data;
   storing the second detection data as the historical detection data corresponding to the current position, in response to the coincidence degree being 0;
   obtaining a first spatial distance between the first detection data and the robot and obtaining a second spatial distance between the projection data and the robot, in response to the coincidence degree being less than a preset threshold; and
   storing the second detection data as the historical detection data corresponding to the current position, in response to the first spatial distance being larger than the second spatial distance; and
   wherein the step of determining the coincidence degree of the projection data and the first detection data comprises:
   aligning the projection data with the first detection data in the detection plane;
   obtaining a first detection value corresponding to the first detection data in the detection plane and obtaining a second detection value corresponding to the projection data in the detection plane, after the alignment;
   calculating a correlation coefficient between the first detection value and the second detection value;
   calculating an expected value of the first detection value and an expected value of the second detection value;
   determining the coincidence degree of the projection data and the first detection data as larger than or equal to the preset threshold, in response to the correlation coefficient being substantially equal to 1 and the expected value of the first detection value being substantially equal to the expected value of the second detection value; and
   determining the coincidence degree of the projection data and the first detection data as less than the preset threshold, in response to the correlation coefficient not being substantially equal to 1 and the expected value of the first detection value not being substantially equal to the expected value of the second detection value.

2. The method of claim 1, wherein an expression of the first detection value is:

$$X=[x_1, x_2, \ldots, x_n | n \in N];$$

an expression of the second detection value is:

$$Y=[y_1, y_2, \ldots, y_m | m \in N];$$

a formula for calculating the correlation coefficient between the first detection value and the second detection value is:

$$\rho_{XY} = \frac{Cov(X, Y)}{\sqrt{D(X)} \cdot \sqrt{D(Y)}};$$

where, X is the first detection value, Y is the second detection value, $x_1, x_2, \ldots, x_n$ each is a value of each data point in the first detection data, $y_1, y_2, \ldots, y_m$ each is a value of each data point in the projection data, N indicates a natural number, $\rho_{XY}$ is the correlation coefficient, Cov(X,Y) is a covariance between the first detection value and the second detection value, D(X) is a variance of the first detection value, and D(Y) is a variance of the second detection value.

3. The method of claim 1, wherein the step of obtaining the first spatial distance between the first detection data and the robot and obtaining the second spatial distance between the projection data and the robot comprises:
   selecting a plurality of first data points from the first detection data in an equal spacing;
   obtaining a spatial distance between each of the first data points and the robot;
   calculating an average value of the spatial distances between all the first data points and the robot to obtain the first spatial distance between the first detection data and the robot;
   selecting a plurality of second data points from the projection data in an equal spacing;
   obtaining a spatial distance between each of the second data points and the robot; and
   calculating an average value of the spatial distances between all the second data points and the robot to obtain the second spatial distance between the projection data and the robot.

4. The method of claim 1, further comprising:
   discarding the second detection data, in response to the coincidence degree being larger than or equal to the preset threshold or the first spatial distance is less than or equal to the second spatial distance.

5. The method of claim 1, wherein the at least one other sensor comprises a depth sensor and an ultrasonic sensor.

6. The method of claim 1, further comprising:
   planning the movement path of the robot based on the collected detection data and generating the movement path information of the movement path, in response to the historical detection data corresponding to the current position having not been stored.

7. The method of claim 1, wherein after the step of obtaining the current position of the robot based on the collected detection data, the method further comprises:
determining whether the collected detection data is valid; and
storing the collected detection data as the historical detection data corresponding to the current position, in response to the collected detection data being valid.

8. A robot comprising:
a plurality of ranging sensors;
a memory;
a processor; and
one or more computer programs stored in the memory and executable on the processor, wherein the one or more computer programs comprise:
instructions for obtaining detection data collected by the plurality of ranging sensors;
instructions for obtaining a current position of the robot based on the collected detection data;
instructions for determining whether historical detection data corresponding to the current position has been stored;
instructions for planning a movement path of the robot based on the collected detection data and the historical detection data and generating movement path information of the movement path, in response to the historical detection data corresponding to the current position having been stored; and
instructions for controlling the robot to move along an obstacle-free path based on the movement path information;
wherein the plurality of ranging sensors comprise a laser sensor and at least one other sensor, and the one or more computer programs further comprise:
instructions for obtaining first detection data of the laser sensor at the current position, and obtaining second detection data of the other sensor at the current position, before obtaining the detection data collected by the plurality of ranging sensors;
instructions for projecting the second detection data to a detection plane of the laser sensor to obtain projection data of the second detection data on the detection plane, wherein the first detection data is on the detection plane;
instructions for determining a coincidence degree of the projection data and the first detection data;
instructions for storing the second detection data as the historical detection data corresponding to the current position, in response to the coincidence degree being 0;
instructions for obtaining a first spatial distance between the first detection data and the robot and obtaining a second spatial distance between the projection data and the robot, in response to the coincidence degree being less than a preset threshold; and
instructions for storing the second detection data as the historical detection data corresponding to the current position, in response to the first spatial distance being larger than the second spatial distance; and
wherein the instructions for determining the coincidence degree of the projection data and the first detection data comprise:
instructions for aligning the projection data with the first detection data in the detection plane;
instructions for obtaining a first detection value corresponding to the first detection data in the detection plane and obtaining a second detection value corresponding to the projection data in the detection plane, after the alignment;
instructions for calculating a correlation coefficient between the first detection value and the second detection value;
instructions for calculating an expected value of the first detection value and an expected value of the second detection value;
instructions for determining the coincidence degree of the projection data and the first detection data as larger than or equal to the preset threshold, in response to the correlation coefficient being substantially equal to 1 and the expected value of the first detection value being substantially equal to the expected value of the second detection value; and
instructions for determining the coincidence degree of the projection data and the first detection data as less than the preset threshold, in response to the correlation coefficient not being substantially equal to 1 and the expected value of the first detection value not being substantially equal to the expected value of the second detection value.

9. The robot of claim 8, wherein an expression of the first detection value is:

$X=[x_1, x_2, \ldots, x_n | n \in N]$;

an expression of the second detection value is:

$Y=[y_1, y_2, \ldots, y_m | m \in N]$;

a formula for calculating the correlation coefficient between the first detection value and the second detection value is:

$$\rho_{XY} = \frac{Cov(X, Y)}{\sqrt{D(X)} \cdot \sqrt{D(Y)}};$$

where, X is the first detection value, Y is the second detection value, $x_1, x_2, \ldots, x_n$ each is a value of each data point in the first detection data, $y_1, y_2, \ldots, y_m$ each is a value of each data point in the projection data, N indicates a natural number, $\rho_{XY}$ is the correlation coefficient, $Cov(X, Y)$ is a covariance between the first detection value and the second detection value, $D(X)$ is a variance of the first detection value, and $D(Y)$ is a variance of the second detection value.

10. The robot of claim 8, wherein the instructions for obtaining the first spatial distance between the first detection data and the robot and obtaining the second spatial distance between the projection data and the robot comprise:
instructions for selecting a plurality of first data points from the first detection data in an equal spacing;
instructions for obtaining a spatial distance between each of the first data points and the robot;
instructions for calculating an average value of the spatial distances between all the first data points and the robot to obtain the first spatial distance between the first detection data and the robot;
instructions for selecting a plurality of second data points from the projection data in an equal spacing;
instructions for obtaining a spatial distance between each of the second data points and the robot; and
instructions for calculating an average value of the spatial distances between all the second data points and the robot to obtain the second spatial distance between the projection data and the robot.

11. The robot of claim 8, the one or more computer programs further comprise:
    instructions for discarding the second detection data, in response to the coincidence degree being larger than or equal to the preset threshold or the first spatial distance is less than or equal to the second spatial distance.

12. The robot of claim 8, wherein the at least one other sensor comprises a depth sensor and an ultrasonic sensor.

13. The robot of claim 8, the one or more computer programs further comprise:
    instructions for planning the movement path of the robot based on the collected detection data and generating the movement path information of the movement path, in response to the historical detection data corresponding to the current position having not been stored.

14. The robot of claim 8, the one or more computer programs further comprise:
    instructions for determining whether the collected detection data is valid; and
    instructions for storing the collected detection data as the historical detection data corresponding to the current position, in response to the collected detection data being valid.

* * * * *